Feb. 20, 1951     J. R. BRODHEAD     2,542,388
STEERING GEAR
Filed Oct. 30, 1947
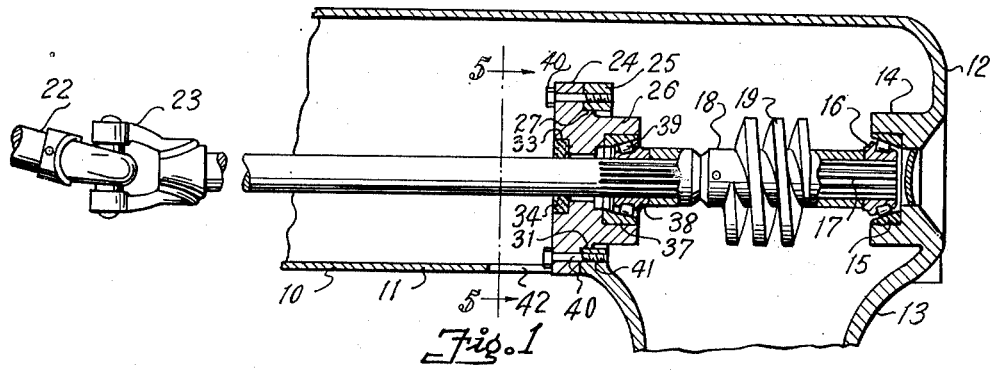
Fig. 1
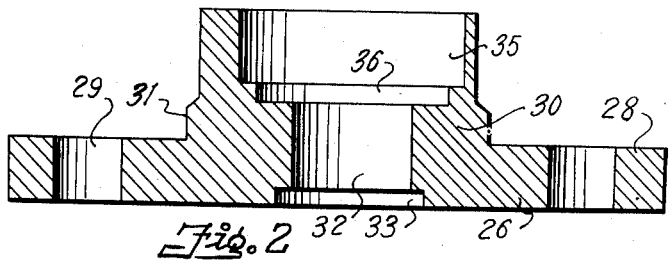
Fig. 2
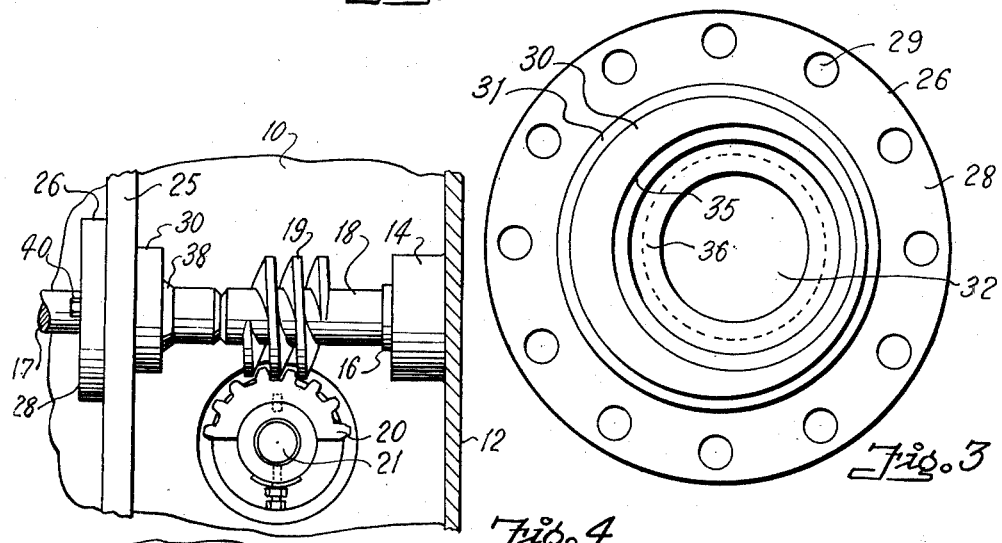
Fig. 3
Fig. 4
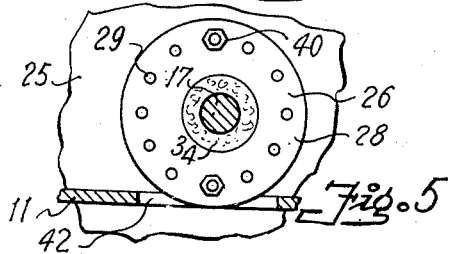
Fig. 5
Inventor
John R. Brodhead
By Ahley & Ahley
Attorneys Patented Feb. 20, 1951

2,542,388

UNITED STATES PATENT OFFICE 2,542,388

STEERING GEAR

John R. Brodhead, Plano, Tex.

Application October 30, 1947, Serial No. 783,007

3 Claims. (Cl. 74—500)

This invention relates to new and useful improvements in steering gears for vehicles.

One object of the invention is to provide an improved steering gear of such construction as to be particularly adapted for use with tractors.

An important object of the invention is to provide an improved steering gear of the worm and sector type wherein the worm bearing member is adjustable to shift the worm laterally to compensate wear of the intermeshing teeth of the worm and segment.

Another object of the invention is to provide a simple and positive eccentric adjustment device of such diametrical amplitude as to afford minute movement of parts, whereby sensitive adjustments may be readily made.

A further object of the invention is to provide an eccentric adjustment device involving rotative parts, whereby the desired adjustment is accomplished by a simple rotation of one of the elements.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a longitudinal, vertical, sectional view of a portion of a tractor steering housing containing a steering gear constructed in accordance with the invention, Fig. 2 is a diametrical, sectional view of an adjustable eccentric bearing collar, Fig. 3 is a front elevation of the collar, Fig. 4 is a plan view of the steering gear, and Fig. 5 is a transverse, vertical, sectional view, taken on the line 5—5 of Fig. 1.

In the drawing, the numeral 10 designates the steering housing of a conventional tractor which has a bottom 11, a front end 12 and a depending hollow front support 13. An annular bearing boss 14, integral with the front end 12, extends inwardly therefrom and has a self-aligning roller bearing 15 seated therein. The bearing 15 includes a cone ring 16 which is splined on the front end of a conventional worm shaft 17. A worm sleeve 18 is also splined on the shaft 17 so as to abut the cone 16 and a worm 19 surrounds the medial portion of the sleeve and is integral therewith. The shaft 17 extends longitudinally in the housing 10 and the teeth of its worm 19 mesh with the teeth of a laterally disposed gear segment or sector 20 which is fastened on the upper end of a steering spindle shaft 21 (Fig. 4). The elements which have been described are conventional and may vary in accordance with the manufacture of the tractor with which the invention is used. Steering gears of the type involved connect the shaft 17 with a steering shaft 22 by means of a universal joint 23; therefore, it is necessary to have an intermediate bearing support for the worm shaft.

The invention resides primarily in the intermediate bearing support, indicated generally, by the numeral 24. The support includes a transverse web plate 25, which may be integral with the bottom 11 and sides of the housing 10, adjacent and in rear of the support 13. A bearing collar 26 surrounds the shaft and is rotatably mounted in a circular opening 27 in the plate 25. The collar 26 has an external, radial flange 28 provided with a plurality of spaced bolt openings 29 and a central annular boss 30, from which the flange extends. The flange 28 bears against one side of the plate 25. An annular shoulder 31 is formed on the boss 30 at its intersection with the flange and has a snug turning fit in the bore 27, but is less in width than the depth of said bore to provide sufficient contact relief to assure easy turning of the collar.

The boss 30 is provided with an eccentric bore 32 through which the worm shaft 17 extends in spaced relation thereto. At the rear end of the bore 32, an annular packing recess 33 is provided for a packing ring 34 which encircles the shaft. An annular bearing seat or counterbore 35 is formed in the outer end of the boss and an annular shoulder or enlarged seat 36 is provided at the inner end of the counterbore. The bore 32, recess 33, counterbore 35 and seat 36 are concentric with respect to each other and have a common longitudinal axis coincident with the longitudinal axis of the shaft 17; however, these elements are eccentric with respect to the flange 28 and boss 30.

The seat 36 has a roller bearing race 37 fitted therein. A cone 38, splined on the shaft 17 rearwardly of the worm 19, engages the rollers 39 of the bearing. The collar 26 is fastened in place by diametrically-opposed bolts 40 passing through two of the flange openings 29 and screwed into two of a registering set or ring of screw-threaded openings 41 in the plate 25 surrounding the bore 27. When the shaft is first installed, prior to inserting the bolts 40, the collar 26 is turned or rotated to space the worm 19 laterally of the sector 20, the necessary distance to give the desired meshing of the worm and sector teeth. This adjustment permits an installation whereby the initial slack or lost motion setting may be regulated.

When wear occurs between the intermeshing teeth and it is desired to compensate the same, it is merely necessary to remove the bolts 40, turn the collar 26 and screw said bolts into another pair of the openings 41. To provide access to the collar, an opening 42 is cut in the bottom 11. It is pointed out that the shaft 17 and the roller bearing members 37, 38 and 39 are, at all times, solidly supported and that there are no loose parts. The collar is likewise mounted and constitutes a single adjusting element, whereby the desired adjustment may be made. By spacing the openings 41 relatively close to each other, it is obvious that a minute lateral adjustment of the shaft 17 may be had because of the radial differences between the bore 32 and the position of said openings.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with the worm shaft, worm screw and sector of a vehicle steering gear, a transverse support through which the shaft extends, a collar surrounding the shaft and rotatably mounted in said support, said collar being offset longitudinally along the shaft from one end of the worm screw and spaced laterally from the end of said screw, a bearing member through which the shaft extends eccentrically mounted in said collar, the shaft extending beyond the worm screw, and a bearing member concentrically receiving the extended portion of the shaft, means supporting the last named bearing member, and means fastening said collar to said support in any one of a plurality of rotational positions.

2. In combination with the worm shaft and worm screw of a vehicle steering gear, a concentric bearing member supporting one end of the shaft, a bearing member surrounding and supporting a medial portion of the shaft, the worm screw being mounted on the shaft between the bearing members and spaced along the shaft from the second named bearing member, a transverse support having a circular opening therein, a collar mounted to rotate in the opening of the support having a flange engaging one side of said support and a boss on the opposite side of said support having an eccentric bore in which the second named bearing member is mounted, and a fastener engaging the support and the collar flange for securing said collar to said support in any one of a plurality of rotational positions.

3. The combination set forth in claim 2 wherein the inner diameter of the collar is substantially greater than the diameter of the worm shaft extending therethrough.

JOHN R. BRODHEAD.

REFERENCES CITED

The following references are of record in the file of this patent:

UNITED STATES PATENTS

| Number | Name | Date |
|---|---|---|
| Re. 20,637 | Hammond et al. | Jan. 25, 1938 |
| 292,927 | Lipe | Feb. 5, 1884 |
| 772,894 | Le Blond et al. | Oct. 18, 1904 |
| 873,526 | Fay et al. | Dec. 10, 1907 |
| 1,815,450 | Schmal | July 21, 1931 |
| 1,829,249 | Von Beulwitz | Oct. 27, 1931 |
| 1,906,720 | Robbins | May 2, 1933 |
| 2,068,679 | Hokansson | Jan. 26, 1937 |
| 2,394,854 | Goodman | Feb. 12, 1946 |

FOREIGN PATENTS

| Number | Country | Date |
|---|---|---|
| 570,600 | Great Britain | July 13, 1945 |